L. H. PERLMAN.
WHEEL.
APPLICATION FILED SEPT. 23, 1916.
1,374,101.
Patented Apr. 5, 1921.
2 SHEETS—SHEET 1.
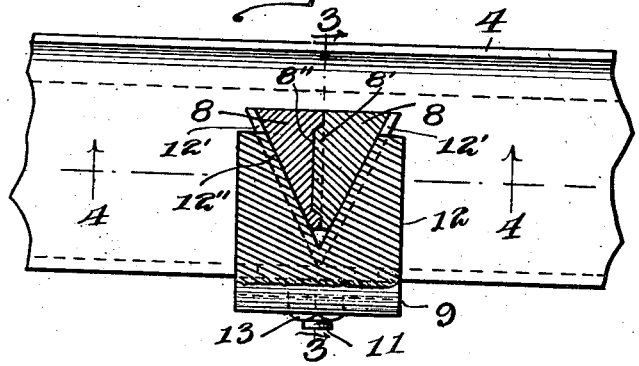
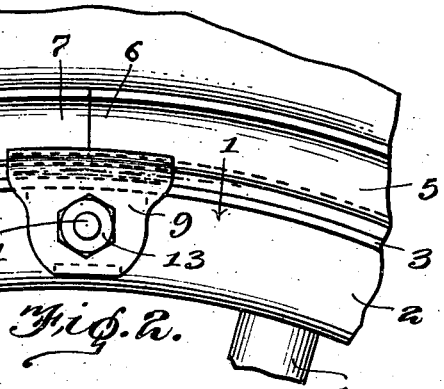
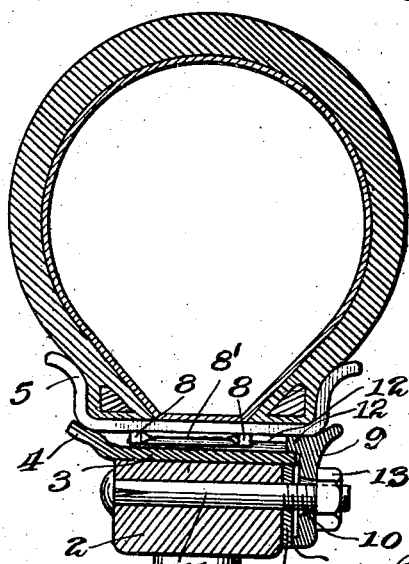
Witnesses
Horace N. Lybrand
C. H. Fesler
Inventor
Louis H. Perlman,
By Edgar M. Kitchin,
his Attorney.

L. H. PERLMAN.
WHEEL.
APPLICATION FILED SEPT. 23, 1916.
1,374,101.
Patented Apr. 5, 1921.
2 SHEETS—SHEET 2.
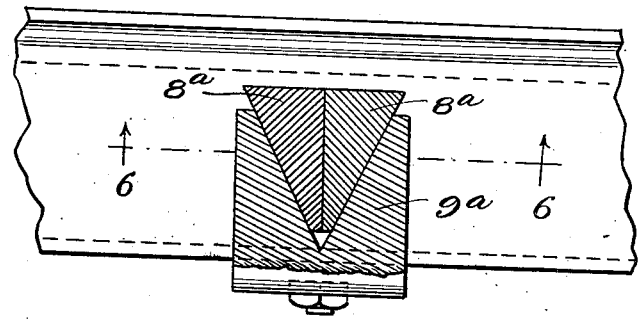
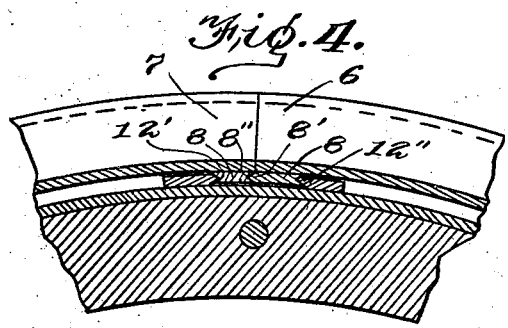 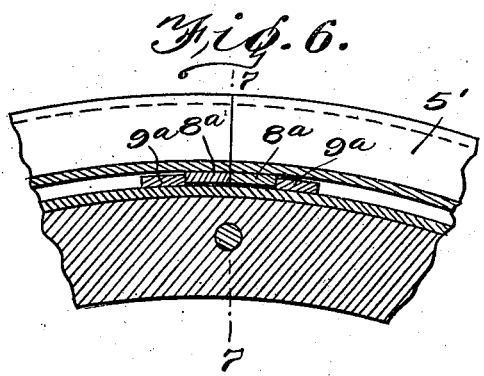
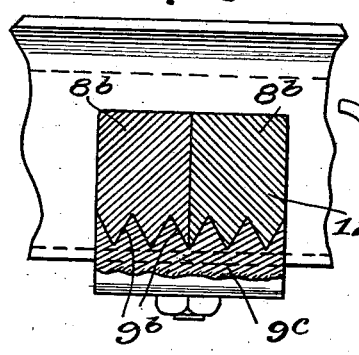 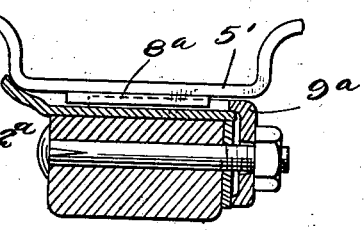
Witnesses
Horace H. Lybrand
C. H. Fesler
Inventor
Louis H. Perlman,
By Edgar M. Kitchin,
his Attorney.

UNITED STATES PATENT OFFICE.

LOUIS H. PERLMAN, OF NEW YORK, N. Y.

WHEEL.

1,374,101.　　　　　Specification of Letters Patent.　　Patented Apr. 5, 1921.

Application filed September 23, 1916.　Serial No. 121,830.

*To all whom it may concern:*

Be it known that I, LOUIS H. PERLMAN, a citizen of the United States, residing at New York city, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in vehicle wheels of the type especially well adapted for use on automobiles, and more particularly relates to that type of wheel structure which has come to be known as a cross cut demountable.

The object in view is the provision of simple and efficient locking means adapted to serve the dual purpose of locking the ends of the rim together and locking the rim onto the wheel body.

With this and further objects in view as will in part hereinafter become apparent and in part be stated, the invention comprises certain novel constructions, combinations and arrangements of parts as subsequently specified and claimed.

In the accompanying drawing,—

Figure 1 is a plan view of a fragment of a wheel embodying the features of the present invention, the locking wedge and demountable rim-carried lugs being seen in section, and the section being taken between the demountable rim and the wheel.

Fig. 2 is a view in elevation thereof with the demountable rim in place.

Fig. 3 is a section taken on the plane indicated by line 3—3 of Fig. 2, parts being seen in elevation.

Fig. 4 is a transverse axial section taken on the plane indicated by line 4—4 of Fig. 1, the demountable rim being shown.

Fig. 5 is a view similar to Fig. 1 of a slightly modified embodiment.

Fig. 6 is a transverse axial section taken on the plane indicated by line 6—6 of Fig. 5, the demountable rim being shown.

Fig. 7 is a cross section taken on the plane indicated by line 7—7 of Fig. 6, parts being seen in elevation.

Fig. 8 is a view similar to Fig. 1 of a still further embodiment.

Referring to the drawing by numerals, 1 indicates the spokes, and 2 the wood felly of an ordinary wheel body, and on the wood felly is mounted the usual felly band or fixed rim 3. The felly band 3 is provided with the customary inside stop flange 4.

Mounted on the wheel body is the demountable rim 5 of the cross-cut channel type, having end portions 6 and 7. Each of these end portions carries at its inner face a tapering plate 8, the two plates lying normally in edge contact and forming a V-shaped structure with the apex of the V presented outward. To effect an interlock between plates 8, one plate 8 is formed with an edgewise outstanding bead 8' which fits within a corresponding recess 8" in the adjacent edge of the other plate 8. Bead 8' and recess 8" preferably terminate short of the length of the respective plate, whereby ends 6 are held against any relative movement other than movement apart in the general direction of the curvature of the rim, that is, angularly.

Each plate 8 is formed with a groove 12' extending within and along the inclined edge of the respective plate.

The rim 5 is supported at its inner edge on the stop flange 4, and may be retained in position by an appropriate number of ordinary wedge locking devices spaced about the rim and not shown in the drawing, or may be retained by any like locking and sustaining means.

At the place of the cross cut of rim 5 a special wedge locking device is provided consisting of the plate or flange 9 apertured as at 10 to accommodate the anchoring bolt 11, the upper portion of the plate 9 being formed integral with a wedge 12 which extends beneath the rim 5 and engages the outer edge thereof. The wedge 11 is tapered to effect pressure on the rim 5 in both radial and axial directions for seating the rim against the flange 4 when the plate 9 is forced toward the felly 2. A nut 13 is threaded onto bolt 11 and engages the outer face of the plate 9 for thus forming the plate. A lip or flange 14 extends toward the felly band 2 from the inner edge of the plate 9 to allow clearance between the plate and the felly band. A wear plate 15 is provided along the outer face of the felly band 2 and serves to take the wear of contact with the plate 9 or its flange 14.

The wedge 12 differs from the ordinary wedge in being bifurcated, as clearly seen in Fig. 1, the arms of the bifurcation being set at such an angle as to form an open V adapted to snugly receive the V-shaped structure comprising the two plates 8. Thus it will be apparent that when the wedge is positioned the plate 8 will be effectively held against circumferential separation. Furthermore, as the wedge 12 is forced inward the inclined walls of the inner edges of the arms of the bifurcation effect a wedging action on the inclined walls of the plates 8 tending to draw the ends of the rim 5 toward each other. This guards against any possible working loose or separation of the ends of the rim 5 during operation.

The arms of the bifurcation of wedge 12 have their inner edges formed with beads 12" adapted to enter and interlock with the grooves 12'. The beads 12" and grooves 12' and the bead 8' and groove 8" are all preferably formed V-shape in cross section, as clearly seen in Fig. 4, which may be otherwise formed when desired.

It is believed that the operation of the structure described will be obvious. The hard beads of the pneumatic tire serve to retain the ends of the rim 5 against separation by angular movement while the rim is being carried as an extra or spare rim and bead 8' prevents separation in all other directions. In use, the rim is mounted on the wheel in the usual way and the locking wedges (not shown) are applied in the customary manner, except that the wedge 12 is applied first and sufficiently tightened to insure against circumferential separation of the ends of the rim before the other wedges are applied. The expanding stress of the other wedges is directly resisted by the arms of the bifurcation of wedge 12 which prevent separation of the plates 8, and thus enable the rim 5 to be effectively tensioned in its operative position without any connector for the ends of rim 5 being carried by the rim.

The operation of removing and applying a pneumatic tire to rim 5 is substantially the same as that employed with any ordinary cross cut demountable rim.

The wedge 12 not only effectively serves to retain the ends of rim 5 in their proper relation but also serves in coöperation with plates 8 as a driver for the rim. In other words, the wedge 12 and plates 8 coöperate to deliver circumferentially-directed stresses to and from the rim and to prevent the rim from creeping circumferentially of the wheel body.

In Figs. 6 and 7 is illustrated a slightly modified embodiment of the invention wherein the demountable rim 5' is of the cross-cut channel type having plates 8ª. 8ª similar in all respects to plate 8, except that the edges of plates 8ª are perfectly flat and not grooved or beaded. The said plates 8ª are engaged by the locking plate 9ª somewhat similar in form to the wedge 9 but differing therefrom in not having an inclined wall engaging the rim 5'. In other words, the plate 9ª is a wedge only in the sense that the arms of its bifurcation engage the inclined walls of the plates 8ª and wedge the said plates and consequently the ends of the rim 5' toward each other. The method of anchorage of the plate 9ª is the same as that employed for the wedge 9, and the structure otherwise corresponds to that described.

In Fig. 8 is illustrated a further embodiment in which plates 8ᵇ are employed having serrations 12ª adapted to interlock with corresponding serrations 9ᵇ carried by plate 9ᶜ. The plate 9ᶜ is anchored to the wheel body in the same manner as are wedge 9 and plate 9ª. It is to be noted that the serrations 12ª and 9ᵇ are of sufficient depth to enable their inclined edges to coöperate in wedging the ends of the rim together and in interlocking the same in place after the same manner as in the other structures above described with only a slight difference in degree.

What I claim is:—

1. In a wheel structure, the combination with a wheel body, of a cross-cut demountable rim therefor adapted to be locked on the wheel body by means stressing the rim circumferentially, the end portions of the demountable rim having inwardly extending projections and a wedge for locking the rim on the wheel body, said wedge being bifurcated and located to have the arms of the bifurcation engage the projections of the rim for preventing separation thereof.

2. In a wheel structure, the combination with a wheel body, of a cross cut demountable rim therefor, the end portions of the demountable rim having inwardly extending projections and a bifurcated plate carried by the wheel body and removably extending between the wheel body and rim and adapted to engage said projections for retaining the ends of the rim in operative relation.

3. In a wheel structure, the combination with a wheel body, of a cross-cut demountable rim therefor adapted to be locked on the wheel body by means stressing the rim circumferentially, the end portions of the demountable rim having inwardly extending projections and a wedge for locking the rim on the wheel body, said wedge being bifurcated and located to have the arms of the bifurcation engage the projections of the rim for preventing separation thereof, the walls of said arms at the points of engagement with the projections being inclined for stressing the projections toward each other when the plate is moved axially inward.

4. The combination with a wheel body, of a cross cut demountable rim therefor, the said rim having a projection at each end, and a bifurcated wedge having the arms of the bifurcation extending between the wheel body and rim and into engagement with the projections, the wedge being inclined in a direction adapted to exert pressure on the rim both radially and laterally as the wedge is being brought to its final operative position, and means for bringing the wedge to such position and retaining it therein.

5. The combination with a wheel body, of a cross cut demountable rim therefor, each end of the rim being formed with a radially inwardly extending plate and the two plates being tapered in a direction for presenting the shape of a V with the apex of the V presented axially outward, and a wedge anchored to the wheel body and bifurcated in a form presenting substantially an open V in position to receive said plates between the wheel body and rim.

6. The combination with a wheel body, of a cross cut demountable rim therefor, each end of the rim being formed with a radially inwardly extending plate and the two plates being tapered in a direction for presenting the shape of a V with the apex of the V presented axially outward, and a rim-locking wedge anchored to the wheel body and bifurcated in a form presenting substantially an open V in position to receive said plates, the wedge being movably mounted and the anchoring means being adapted to shift the wedge axially across the periphery of the wheel body.

7. In a wheel structure, the combination with a wheel body, of a cross cut demountable rim therefor adapted to be locked on the wheel body by means stressing the rim circumferentially, the end portions of the demountable rim having inwardly-extending projections and the projections being interlocked by being formed one with a lateral extension and the other with a corresponding recess into which the said extension fits, and a wedge for locking the rim on the wheel body, said wedge being bifurcated and located to have the arms of the bifurcation engage the projections of the demountable rim for preventing separation thereof.

In testimony whereof I affix my signature in presence of two witnesses.

LOUIS H. PERLMAN.

Witnesses:
I. B. LEIBSON,
O. W. MOTT.